(12) United States Patent
Chong et al.

(10) Patent No.: US 9,477,030 B2
(45) Date of Patent: Oct. 25, 2016

(54) BACKLIGHT UNIT AND DISPLAY DEVICE

(71) Applicants: BOE TECHNOLOGY GROUP CO., LTD., Beijing (CN); BEIJING BOE CHATANI ELECTRONICS CO., LTD., Beijing (CN)

(72) Inventors: Qiaowei Chong, Beijing (CN); Dongsheng Yang, Beijing (CN)

(73) Assignees: BOE Technology Group Co., Ltd., Beijing (CN); Beijing BOE CHATANI Electronics Co., Ltd., Beijing (CN)

( * ) Notice: Subject to any disclaimer, the term of this patent is extended or adjusted under 35 U.S.C. 154(b) by 33 days.

(21) Appl. No.: 14/406,867

(22) PCT Filed: Jun. 27, 2014

(86) PCT No.: PCT/CN2014/080904
§ 371 (c)(1),
(2) Date: Dec. 10, 2014

(87) PCT Pub. No.: WO2015/100982
PCT Pub. Date: Jul. 9, 2015

(65) Prior Publication Data
US 2015/0331174 A1 Nov. 19, 2015

(30) Foreign Application Priority Data

Dec. 31, 2013 (CN) .......................... 2013 1 0750470

(51) Int. Cl.
*F21V 8/00* (2006.01)
*F21V 17/04* (2006.01)

(52) U.S. Cl.
CPC ........... *G02B 6/0051* (2013.01); *G02B 6/0025* (2013.01); *G02B 6/0083* (2013.01); *G02B 6/0088* (2013.01); *G02B 6/0068* (2013.01)

(58) Field of Classification Search
CPC  G02B 6/0025; G02B 6/0051; G02B 6/0068; G02B 6/0083; G02B 6/0088
See application file for complete search history.

(56) References Cited

U.S. PATENT DOCUMENTS 8,441,597 B2    5/2013  Kim
8,681,292 B2    3/2014  Kim
(Continued)

FOREIGN PATENT DOCUMENTS

| CN | 101738751 A | 6/2010 |
| CN | 101762908 A | 6/2010 |
| CN | 101930137 A | 12/2010 |
| CN | 103728776 A | 4/2014 |
| JP | H09281490 A | 10/1997 |

OTHER PUBLICATIONS

English translation of the International Search Report of PCT/CN2014/080904, mailed Sep. 12, 2014.
(Continued)

*Primary Examiner* — Alan Cariaso
(74) *Attorney, Agent, or Firm* — Collard & Roe, P.C.

(57) ABSTRACT

A backlight unit and a display device are provided. The backlight unit includes: a circuit board (20); at least one light source (21) provided on the circuit board (20); a light guiding plate (112) comprising a light incident side, which is configured for receiving light emitted by the at least one light source, and a light exit side; and a diffusion plate (114) provided on the light exit side of the light guiding plate (112). The diffusion plate (114) includes a diffusion-plate body (141) and at least one diffusion-plate extension part (142) that is located on at least one side of the diffusion-plate body (141) and connected to the diffusion-plate body (141). The diffusion-plate extension part (142) is located between the circuit board (20) and the light guiding plate (112). A position of the diffusion-plate extension part (142) corresponds to a position of the light source (121).

16 Claims, 3 Drawing Sheets

(56) References Cited

U.S. PATENT DOCUMENTS

| | | | |
|---|---|---|---|
| 8,814,412 B2* | 8/2014 | Yabe | G02B 6/002 362/606 |
| 8,864,361 B2* | 10/2014 | Motooka | G02B 6/0013 349/64 |
| 8,931,943 B2* | 1/2015 | Kunimochi | G02B 6/0011 362/609 |
| 9,195,087 B2* | 11/2015 | Terashima | G02B 6/0085 |
| 9,239,421 B2* | 1/2016 | Minoura | G02B 6/0051 |
| 2010/0165232 A1* | 7/2010 | Park | G02B 6/0051 349/58 |
| 2015/0331174 A1* | 11/2015 | Chong | G02B 6/0051 362/606 |

OTHER PUBLICATIONS

English translation of the Written Opinion of the International Searching Authority of PCT/CN2014/080904, mailed Sep. 12, 2014.

International Search Report, International Preliminary Report on Patentability and Written Opinion of the International Searching Authority of PCT/ CN2014/080904 in Chinese, mailed Sep. 12, 2014.

* cited by examiner

BACKLIGHT UNIT AND DISPLAY DEVICE

CROSS REFERENCE TO RELATED APPLICATIONS

This application is the National Stage of PCT/CN2014/080904 filed on Jun. 27, 2014, which claims priority under 35 U.S.C. §119 of Chinese Application No. 201310750470.5 filed on Dec. 31, 2013, the disclosure of which is incorporated by reference.

TECHNICAL FIELD

Embodiments of the disclosure relate to a backlight unit and a display device.

BACKGROUND

With the fast development of display technologies, liquid crystal displays (LCDs), as flat plate displays, are more and more used in the high-performance display field because of their features such as small volume, low power consumption, free of radiation and relatively low manufacturing cost.

A liquid crystal display is a kind of passive light-emitting devices, and needs a backlight unit (BLU) to provide a light source to the liquid crystal display so as to make it display images. A backlight unit of a liquid crystal display known to the inventor, as illustrated in FIG. 1a, mainly includes a flexible printed circuit board 10 (short for FPCB), a light bar used as a light source and formed by a plurality of LEDs 11 (Light-Emitting Diodes), and a light guiding plate 12. A sectional view illustrated in FIG. 1b is obtained taken along a dotted line A-A' in FIG. 1a, and the backlight unit further includes an adhesive tape 13 used for bonding the light guiding plate 12 and the flexible printed circuit board 10, and a diffusion plate 14 located on a side of the light guiding plate 12.

However, it can be seen from FIG. 1b that because the light guiding plate 12 and the flexible printed circuit board 10 are bonded by the adhesive tape 13, a gap exists between the flexible printed circuit board 10 and the light guiding plate 12, and in the meantime an expansion gap 15 needs to be set aside during the process of assembling the flexible printed circuit board 10 and the diffusion plate 14. Furthermore, because of the development trend of a narrow-bezel display, the distance between the light bar and a visible area of a liquid crystal module (short for LCM) is caused to be smaller and smaller. In this way, light emitted by the LEDs can pass through the gap and enter the visible area of the liquid crystal module, and thus a light leak phenomenon occurs. This light leak phenomenon restricts the quality of a liquid crystal panel greatly, and decreases the display effect of the liquid crystal display device.

SUMMARY

An embodiment of the disclosure provides a backlight unit, which includes: a circuit board; at least one light source provided on the circuit board; a light guiding plate comprising a light incident side, which is configured for receiving light emitted by the at least one light source, and a light exit side; and a diffusion plate provided on the light exit side of the light guiding plate. The diffusion plate includes a diffusion-plate body and at least one diffusion-plate extension part that is located on at least one side of the diffusion-plate body and connected to the diffusion-plate body; the diffusion-plate extension part is located between the circuit board and the light guiding plate; and a position of the diffusion-plate extension part corresponds to a position of the light source.

Another embodiment of the disclosure provides a display device, which includes the above-mentioned backlight unit.

BRIEF DESCRIPTION OF THE DRAWINGS

In order to clearly illustrate the technical solution of the embodiments of the disclosure, the drawings needed in descriptions of the embodiments or related technologies will be briefly described in the following; it is obvious that the described drawings are only related to some embodiments of the disclosure and thus are not limitative of the disclosure.

DETAILED DESCRIPTION

The technical solutions in the embodiments of the disclosure will be described in a clearly and fully understandable way in connection with the drawings related to the embodiments of the disclosure. Apparently, the described embodiments are just a part but not all of the embodiments of the disclosure. Based on the embodiments of the disclosure, those skilled in the art can obtain other embodiment(s), without any inventive work, which should be within the scope of the disclosure.

Embodiments of the disclosure provide a backlight unit and a display device, which can reduce or eliminate the light leak phenomenon caused by the light emitted by a light source passing through the gap between a light guiding plate and a circuit board.

Figure 1A:
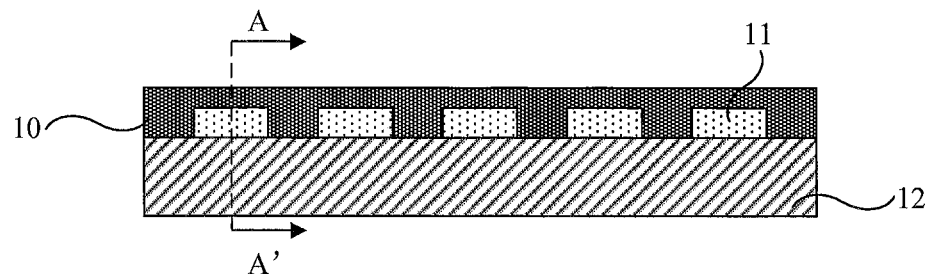
FIG. 1a is a schematic plan view of a structure of a backlight unit provided by a related technology.
Figure 1B:
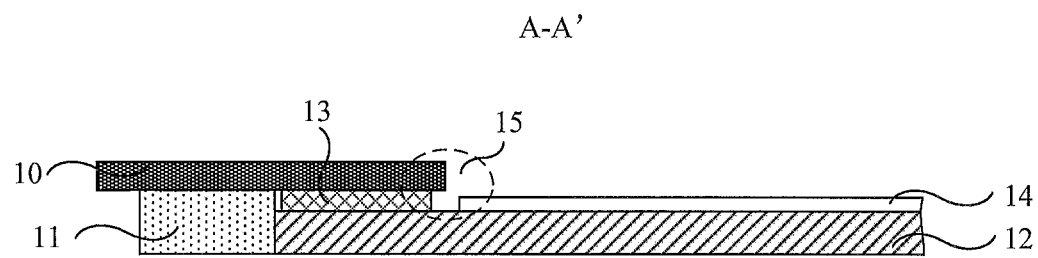
FIG. 1b is a schematic sectional view of a structure of the backlight unit in FIG. 1a taken along the line A-A'.
Figure 2A:
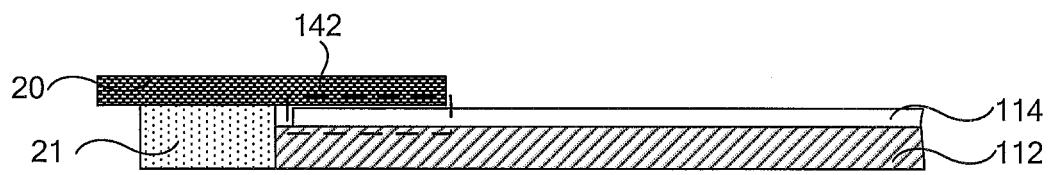
FIG. 2a is a schematic sectional view of a structure of a backlight unit provided by a first embodiment of the disclosure.

A first embodiment of the disclosure provides a backlight unit. FIG. 2a is a schematic sectional view of a structure of the backlight unit provided by the first embodiment of the disclosure, taken along the line B-B' in the plan view illustrated in FIG. 2c; and FIG. 2c is a plan view of the backlight unit provided by the first embodiment of the disclosure.

As illustrated in FIG. 2a, the backlight unit comprises a circuit board 20, at least one light source 21 provided on a surface of the circuit board 20, a light guiding plate 112 that is opposite to the light source 21, and a diffusion plate 114 provided on a light exit side 112 of the light guiding plate.

Figure 2B:
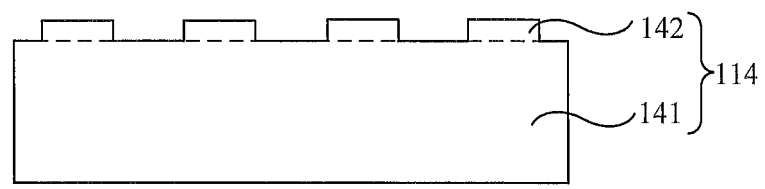
FIG. 2b is a schematic view of a structure of a diffusion plate adopted in the backlight unit provided by the first embodiment of the disclosure.

As illustrated in FIG. 2b, the diffusion plate 114 can include a diffusion-plate body 141, and at least one diffusion-plate extension part 142 that is located on at least one side of the diffusion-plate body 141 and connected to the diffusion-plate body 141. In the present embodiment, three diffusion-plate extension parts 142 are formed on a side of the diffusion-plate body 141 and connected to the diffusion-plate body 141. The diffusion-plate extension parts 142 can be located between the circuit board 20 and the light guiding plate 112, and the position of a diffusion-plate extension part 142 corresponds to the position of a light source 2.

Figure 2C:
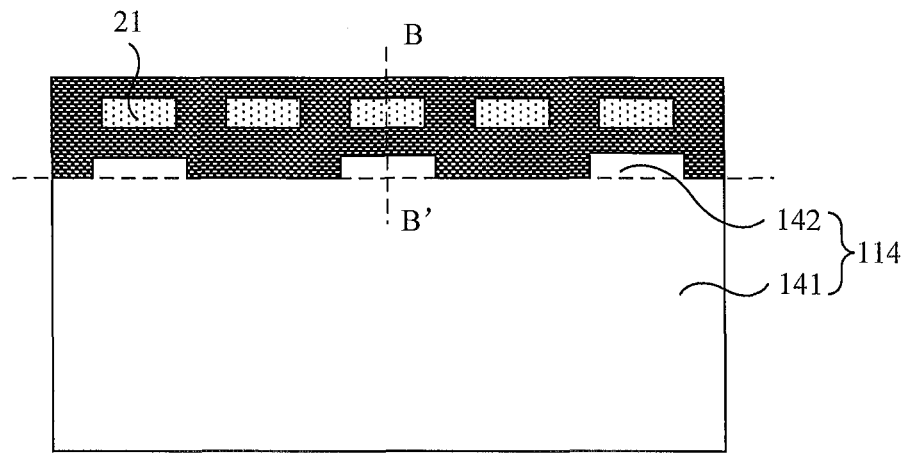
FIG. 2c is a schematic plan view of the structure of the backlight unit provided by the first embodiment of the disclosure.

In the bottom plan view illustrated in FIG. 2c, the light guiding plate 112 is not illustrated. It can be known in connection with FIG. 2a to FIG. 2c that in the backlight unit provided by the first embodiment of the present disclosure, each of the diffusion-plate extension parts 142 formed on a side of the diffusion-plate body 141 can be aligned with one light source 21.

When the backlight unit is a unilateral lighting type, the diffusion-plate extension part 142 is formed on one side of the diffusion-plate body 141, as the diffusion plate 114 in the first embodiment of the disclosure is formed; and in other embodiments of the disclosure, when the backlight unit is a bilateral lighting type or a multilateral lighting type, the diffusion-plate extension parts 142 are formed on two sides or multiple sides of the diffusion-plate body 141.

The first embodiment of the disclosure provides a backlight unit, and the backlight unit includes a circuit board, at least one light source provided on a surface of the circuit board, a light guiding plate that is opposite to the light source, and a diffusion plate provided on a light exit side of the light guiding plate; the diffusion plate includes a diffusion-plate body, and at least one diffusion-plate extension part that is located on at least one side of the diffusion-plate body and connected to the diffusion-plate body; and the diffusion-plate extension part is located between the circuit board and the light guiding plate, and a position of the diffusion-plate extension part corresponds to a position of the light source. In this way, the gap between the circuit board and the light guiding plate can be filled by the diffusion-plate extension part, which prevents the light emitted by the light source from passing through the above-mentioned gap, thus can eliminated the light leak phenomenon, and improve the display effect of the display device and the production quality.

Figure 3A:
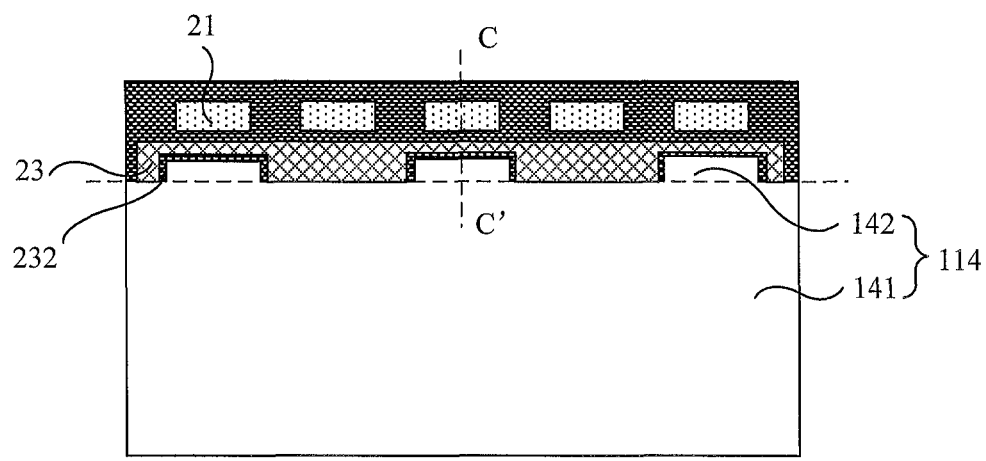
FIG. 3a is a schematic plan view of a structure of a backlight unit provided by a second embodiment of the disclosure.
Figure 3B:
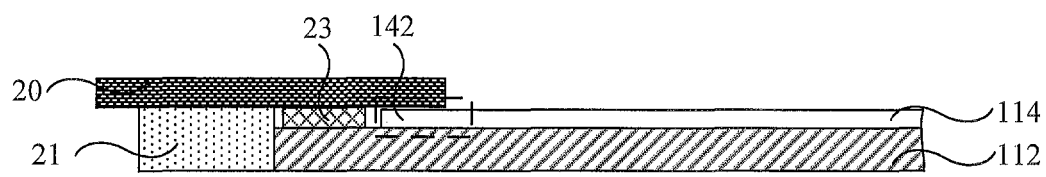
FIG. 3b is a schematic sectional view of the structure of the backlight unit provided by the second embodiment of the disclosure.

A second embodiment of the disclosure provides a backlight unit, as illustrated in FIG. 3a to 3b, and the backlight unit can have a basically same structure as the backlight unit provided by the first embodiment, except for the connecting layer 23. Therefore, descriptions for the same components are omitted herein, and the same terms and reference signs are used to stand for the same or similar components.

FIG. 3a is a plan view of the backlight unit provided by the second embodiment of the disclosure. FIG. 3b is a schematic sectional view of a structure of the backlight unit provided by the second embodiment of the disclosure, taken along the line C-C' in the plan view illustrated in FIG. 3a; and as illustrated in FIG. 3a and FIG. 3b, the connecting layer 23 can be provided between the circuit board 20 and the light guiding plate 112.

The connecting layer 23 is provided on a side of the circuit board 20, close to the light guiding plate 112.

The connecting layer 23 is formed with a connecting-layer concave part 232 on its side close to the diffusion plate 114 and at a position corresponding to that formed with the diffusion-plate extension part 142.

As illustrated in FIG. 3b, the circuit board 20 and the light guiding plate 112 can be connected to each other through the connecting layer 23. The circuit board 20 can be a flexible printed circuit board (FPCB).

In this way, the diffusion-plate extension part 142 and the connecting layer 23 can be meshed with each other through the connecting-layer concave part 232. It is to be illustrated that the above-mentioned being meshed with each other refers to a protruding portion of the diffusion plate 114, namely the diffusion-plate extension part 142, is right located inside the concave portion of the connecting layer 23, namely the connecting-layer concave part 232.

As for a backlight unit of a small-sized or a middle-sized liquid crystal display, the circuit board 20 of the backlight unit and the light guiding plate 112 are fixed to each other through the connecting member (for example, the connecting layer), so in order to decrease the light leak, a part of the connecting layer 23 configured for connecting the circuit board 20 and the light guiding plate 112 can be removed, so that the diffusion-plate extension part 142 can be located in the connecting-layer concave part 232 between the circuit board 20 and the light guiding plate 112 on the premise that the circuit board 20 and the light guiding plate 112 can be guaranteed to remain connecting with each other. In this way, the circuit board 20 and the light guiding plate 112 can be fixed to each other, meanwhile, the diffusion-plate extension part 142 located inside the connecting-layer concave part 232 can avoid the occurrence of the light leak phenomenon caused by the light emitted by the light source 21 and passing through the gap between the circuit board 20 and the light guiding plate 112 to be incident to the visible area of the LCM.

Besides, in embodiments of this application, a LED can be used as the light source 21. However, the LED is a high-brightness point light source, and the light emitted by the LED can enter from a light incident side of the light guiding plate 112 and form an irradiation shape that changes from narrow to wide. In the meantime, there is a certain gap between LEDs, thus a strong-light area and a weak-light area can be formed obviously, such a strong light and a weak light alternate with each other, and a phenomenon that light is emitted in a flickering way as a firefly emits light can occur. The generation of the firefly phenomenon can affect the display effect of the display device and decrease the performances of the display device. However, in embodiments of the present disclosure, by forming a plurality of the connecting-layer concave parts 232 recessed into the connecting layer 23, the circuit board 20 and the light guiding plate 112 can still be connected to each other through the connecting layer 23, and in the meantime, a diffusion-plate extension part 142 can be located inside a connecting-layer concave part 232, so that the diffusion-plate extension part 142 can evenly diffuse the light of the high-brightness light source, which is emitted by the LEDs and enters from a side of the light guiding plate 112, thus to prevent the above-mentioned high-brightness point light source from generating the firefly phenomenon. Therefore, the display performance of the display device and the production quality can be improved.

Furthermore, the position of the connecting-layer concave part 232 can correspond to that of the light source 21. For example, the central axis of the connecting-layer concave part 232 coincides with that of the light source 21 (for example, both the central axes are located in the dotted line C-C' illustrated in FIG. 3a). In this way, the diffusion-plate extension part 142 located in the connecting-layer concave part 232 can correspond to the position of the light source 21, namely the central axis of the diffusion-plate extension part 142 and that of the light source 21 are also located in the above-mentioned dotted line C-C', so that the diffusion-plate extension part 142 can receive the light emitted by the light source 21 and entering from a side of the light guiding plate 112 to the utmost extent. In the meantime, as illustrated in FIG. 3a, connecting-layer concave parts 232 are provided to be corresponding to a part of the light sources 21, which can make the area of the connecting layer 23 large as much as possible, and thus guarantee the stability of the connection between the circuit board 20 and the light guiding plate 112.

Figure 4:
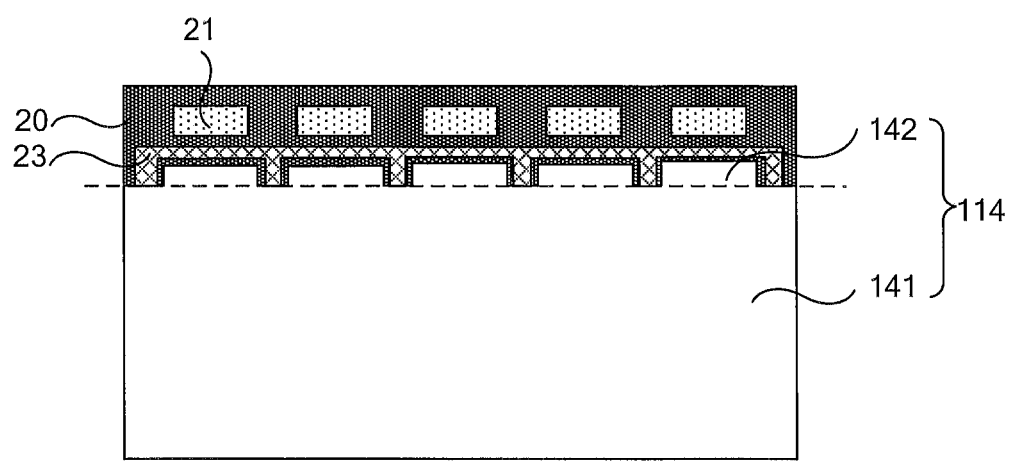
FIG. 4 is a schematic plan view of a structure of another backlight unit provided by an embodiment of the disclosure.

In another embodiment, as illustrated in FIG. 4, each light source 21 (for example, LED) can correspond to one connecting-layer concave part 232; and, for example, each connecting-layer concave part 232 can correspond to one diffusion-plate extension part 142. In this way, it can be guaranteed that in the place corresponding to the position where each light source 21 is located, each connecting-layer concave part 232 corresponds to one diffusion-plate extension part 142, so that the light emitted by each light source 21, during passing through the gap between the circuit board 20 and the light guiding plate 112, can be blocked by the diffusion-plate extension part 142 that corresponds to the above-mentioned position of the light source 21 and located in the connecting-layer concave part 232. Therefore, it is possible to decrease the light leak to the utmost extent and to improve the display performances of the display device.

Furthermore, the diffusion-plate extension part 142 and the connecting-layer concave part 232 can match each other in shape and size.

For example, as illustrated in FIG. 4, both the shape of the diffusion-plate extension part 142 and the shape of the connecting-layer concave part 232 can be a rectangle, and the area of the diffusion-plate extension part 142 is slightly smaller than that of the connecting-layer concave part 232. In this way, when the diffusion-plate extension part 142 is located in the connecting-layer concave part 232, because the area of the diffusion-plate extension part 142 is slightly smaller than that of the connecting-layer concave part 232, the gap between the diffusion-plate extension part 142 and the connecting-layer concave part 232 is very small, and thus when the light emitted by the light source 21 passes through the gap between the circuit board 20 and the light guiding plate 112, the diffusion-plate extension part 142 can block almost all the light, which can weaken the light leak phenomenon effectively; and in this way, the diffusion-plate extension part 142 that has the shape and size matched with those of the connecting-layer concave part 232 can evenly diffuse the received light emitted by the light source 21 (for example, the high-brightness point light source LEDs), and thus can eliminate the firefly phenomenon caused by LEDs to a large extent. Therefore, the display performances of the display device and the production quality can be improved.

According to the actual production need or different requirements for the connection stability of the connecting layer 23 used for connecting the circuit board 20 and the light guiding plate 112, a person skilled in the art can select the diffusion-plate extension part 142 and the connecting-layer concave part 232 that have other shapes, for example, trapezoid, sector, triangle, and so on. For example: as for a middle-sized display device, the connecting layer 23 that connects the circuit board 20 and the light guiding plate 112 needs a higher connection stability, and as for a small-sized or even a miniature display device, the requirement for the stability of the connection between the circuit board 20 and the light guiding plate 112 can be accordingly reduced. Therefore, with regard to different production and design requirements, the shapes of the diffusion-plate extension part 142 and the connecting-layer concave part 232 can be designed individually, so that it is possible to eliminate the light leak phenomenon of the display device, and to guarantee the stability of connection between the circuit board 20 and the light guiding plate 112 to the utmost extent simultaneously. As for other shapes of the diffusion-plate extension part 142 and the connecting-layer concave part 232, detailed descriptions are omitted in this embodiment, which should be within the scope of the present disclosure, however.

In an example, a luminous range of the light source 21 at a position of the diffusion-plate extension part 142 to which the light source corresponds is smaller than a coverage area of the diffusion-plate extension part 142.

For example, when the position of the connecting-layer concave part 232 corresponds to that of the light source 21 and the position of the diffusion-plate extension part 142 located in the connecting-layer concave part 232 is also corresponding to the position of the light source 21, namely when the central axes of the connecting-layer concave part 232, the light source 21 and the diffusion-plate extension part 142 coincide with each other (for example, when all of them are located in the dotted line C-C' in FIG. 3a), the luminous range of the light source 21 at the position of the diffusion-plate extension part 142 to which the light source corresponds is smaller than the coverage area of the diffusion-plate extension part 142, in such a way that all the light emitted by the light source 21 and passing through the gap between the circuit board 20 and the light guiding plate 112 can be received by the diffusion-plate extension part 142 inside the connecting-layer concave part 232. Therefore, the light leak phenomenon can be avoided completely. Furthermore, the light completely received by the diffusion-plate extension part 142 and emitted by the light source 21 (for example, the high-brightness point light source LEDs) is diffused evenly under the action of the diffusion-plate extension part 142, which avoids the occurrence of the firefly phenomenon, and thus improves the display performances of the display device and the quality of the display device.

In an example, the material for the connecting layer 23 can be an adhesive tape or other materials having an adhesive performance, and the disclosure is not limited thereto.

The connecting layer 23 can also be used to connect other components in the backlight unit. For example, the connecting layer 23 can be used for connecting the frames that are used for fixing respective components in the backlight unit.

Embodiments of the disclosure provide a display device, which includes any of the above-mentioned backlight units and has the same beneficial effects as the backlight units provided by the preceding embodiments of the disclosure. Because the backlight unit is described in detail in the preceding embodiments, detailed descriptions are omitted herein.

In embodiments of the disclosure, for example, display devices can include a liquid crystal display device and an organic light-emitting diode display device at least. For example, the display device may be any product or part with display function, such as a liquid crystal display, a liquid crystal television, a digital frame, a cell phone, and a tablet computer.

Embodiments of the disclosure provides a display device, which includes a circuit board, at least one light source provided on a surface of the circuit board, a light guiding plate that is opposite to the light source, and a diffusion plate provided on a light exit side of the light guiding plate; the diffusion plate includes a diffusion-plate body and at least one diffusion-plate extension part that is located on at least one side of the diffusion-plate body and connected to the diffusion-plate body; and the diffusion-plate extension part is located between the circuit board and the light guiding plate, and the position of the diffusion-plate extension part corresponds to the position of the light source.

In this way, the gap between the circuit board and the light guiding plate can be filled by the diffusion-plate extension part, and this prevents the light emitted by the light source from passing through the above-mentioned gap, thus can eliminate the light leak phenomenon and improve the display effect of the display device and the production quality.

In an example, the circuit board and the light guiding plate are fixed to each other through a connecting member.

In an example, the connecting member comprises a connecting layer provided between the circuit board and the light guiding plate, the connecting layer is formed with a connecting-layer concave part on a side of the connecting layer adjacent to the diffusion plate, and the connecting-layer concave part corresponds to the position of the diffusion-plate extension part.

In an example, a position of the connecting-layer concave part corresponds to the position of the light source.

In an example, each light source corresponds to one connecting-layer concave part; and each connecting-layer concave part corresponds to one diffusion-plate extension part.

In an example, the diffusion-plate extension part and the connecting-layer concave part match each other in shape.

In an example, a luminous range of the light source at the position of the diffusion-plate extension part to which the light source corresponds is smaller than a coverage area of the diffusion-plate extension part.

In an example, a material of the connecting layer comprises an adhesive tape.

The foregoing paragraphs have made a detailed description for the present disclosure with general illustrations and specific embodiments, but on the basis of the present disclosure, modifications or improvements may be made, and this is obvious for those skilled in the art. Therefore, all these modifications or improvements made without departing from the spirit of the present disclosure are with the scope of the disclosure.

This application claims the benefit of Chinese Patent Application No. 201310750470.5, filed on Dec. 31, 2013, which is hereby entirely incorporated by reference.

The invention claimed is:

1. A backlight unit, comprising: a circuit board; at least one light source provided on the circuit board; a light guiding plate comprising a light incident side, which is configured for receiving light emitted by the at least one light source, and a light exit side; and a diffusion plate provided on the light exit side of the light guiding plate, wherein
the diffusion plate comprises a diffusion-plate body and at least one diffusion-plate extension part that is located on at least one side of the diffusion-plate body and connected to the diffusion-plate body; the diffusion-plate extension part is located between the circuit board and the light guiding plate; and a position of the diffusion-plate extension part corresponds to a position of the light source, wherein the circuit board and the light guiding plate are fixed to each other through a connecting member, the connecting member comprises a connecting layer provided between the circuit board and the light guiding plate, the connecting layer is formed with a connecting-layer concave part on a side of the connecting layer adjacent to the diffusion plate and at a position corresponding to the position of the diffusion-plate extension part.

2. The backlight unit according to claim 1, wherein a position of the connecting-layer concave part corresponds to the position of the light source.

3. The backlight unit according to claim 1, wherein
each light source corresponds to one connecting-layer concave part; and
each connecting-layer concave part corresponds to one diffusion-plate extension part.

4. The backlight unit according to claim 1, wherein the diffusion-plate extension part and the connecting-layer concave part match each other in shape.

5. The backlight unit according to claim 1, wherein a luminous range of the light source at the position of the diffusion-plate extension part to which the light source corresponds is smaller than a coverage area of the diffusion-plate extension part.

6. The backlight unit according to claim 5, wherein a material of the connecting layer comprises an adhesive tape.

7. The backlight unit according to claim 2, wherein
each light source corresponds to one connecting-layer concave part; and
each connecting-layer concave part corresponds to one diffusion-plate extension part.

8. The backlight unit according to claim 2, wherein the diffusion-plate extension part and the connecting-layer concave part match each other in shape.

9. The backlight unit according to claim 3, wherein the diffusion-plate extension part and the connecting-layer concave part match each other in shape.

10. The backlight unit according to claim 2, wherein a luminous range of the light source at the position of the diffusion-plate extension part to which the light source corresponds is smaller than a coverage area of the diffusion-plate extension part.

11. The backlight unit according to claim 3, wherein a luminous range of the light source at the position of the diffusion-plate extension part to which the light source corresponds is smaller than a coverage area of the diffusion-plate extension part.

12. The backlight unit according to claim 4, wherein a luminous range of the light source at the position of the diffusion-plate extension part to which the light source corresponds is smaller than a coverage area of the diffusion-plate extension part.

13. A display device, comprising:
a backlight unit, wherein the backlight unit comprises:
a circuit board;
at least one light source provided on the circuit board;
a light guiding plate comprising a light incident side, which is configured for receiving light emitted by the at least one light source, and a light exit side; and
a diffusion plate provided on the light exit side of the light guiding plate, wherein
the diffusion plate comprises:
a diffusion-plate body and at least one diffusion-plate extension part that is located on at least one side of the diffusion-plate body and connected to the diffusion-plate body;
the diffusion-plate extension part is located between the circuit board and the light guiding plate; and
a position of the diffusion-plate extension part corresponds to a position of the light source,
wherein the circuit board and the light guiding plate are fixed to each other through a connecting member, the connecting member comprises a connecting layer provided between the circuit board and the light guiding plate, the connecting layer is formed with a connecting-layer concave part on a side of the connecting layer adjacent to the diffusion plate and at a position corresponding to the position of the diffusion-plate extension part.

14. The display device according to claim 13, wherein a position of the connecting-layer concave part corresponds to the position of the light source.

15. The display device according to claim 13, wherein
   each light source corresponds to one connecting-layer concave part; and
   each connecting-layer concave part corresponds to one diffusion-plate extension part.

16. The display device according to claim 13, wherein the diffusion-plate extension part and the connecting-layer concave part match each other in shape.

* * * * *